May 8, 1951     A. G. HOUPT     2,552,279
MULTILAYER CATALYST GAUZE STRUCTURE
Filed April 24, 1947     2 Sheets-Sheet 1
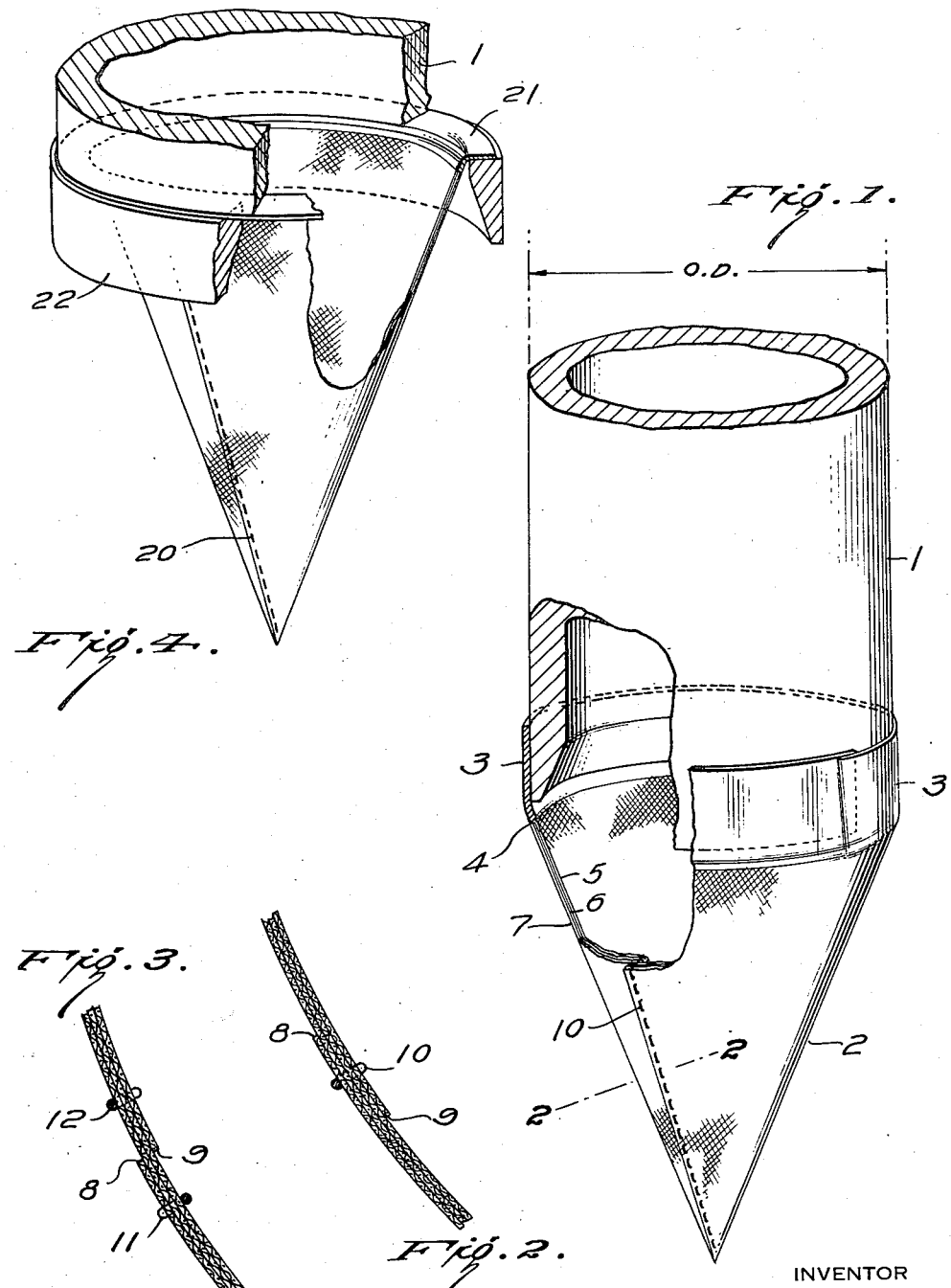
INVENTOR
ALFRED G. HOUPT,
BY
ATTORNEY May 8, 1951 A. G. HOUPT 2,552,279
MULTILAYER CATALYST GAUZE STRUCTURE
Filed April 24, 1947 2 Sheets-Sheet 2
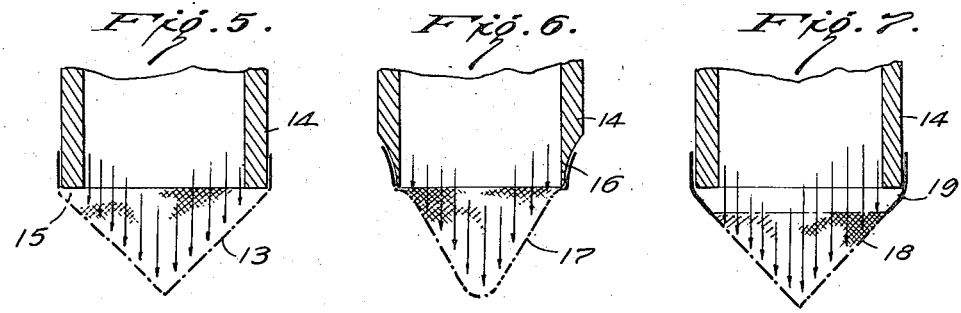
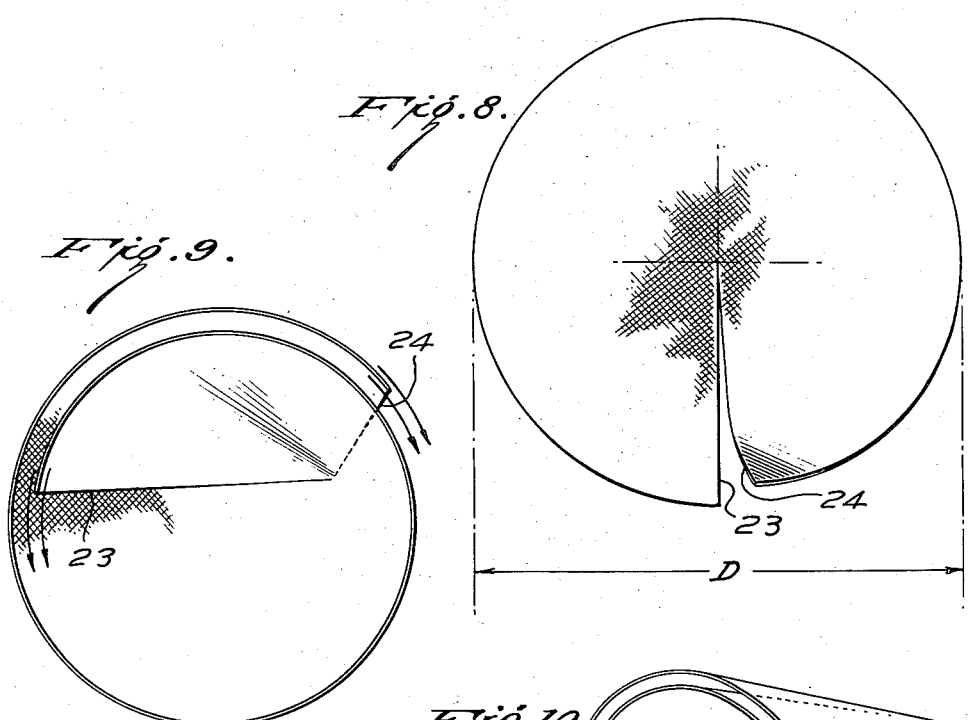
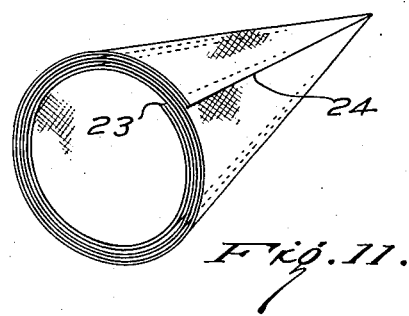
INVENTOR
ALFRED G. HOUPT,
BY
Omer W. Harmon
ATTORNEY Patented May 8, 1951

2,552,279

UNITED STATES PATENT OFFICE 2,552,279

MULTILAYER CATALYST GAUZE STRUCTURE

Alfred G. Houpt, Stamford, Conn., assignor to American Cyanamid Company, New York, N. Y., a corporation of Maine Application April 24, 1947, Serial No. 743,591

4 Claims. (Cl. 252—477)

This invention relates to an improvement in apparatus for performing catalytic oxidation and more particularly to an improved catalyst for this purpose. Still more specifically, the invention relates to an improved catalyst gauze structure, one particularly well adapted for use in producing hydrocyanic acid.

Production of hydrocyanic acid for numerous uses has been accomplished in many different ways. Some of these, for example the acid treatment of cyanides, have been developed industrially to produce large annual tonnages. Because of the importance of the product, frequent proposals have been advanced for additional processes using novel or more readily-available raw materials. Usually, these represent attempts to lower production costs. For various reasons, none of these proposals have proved to be wholly successful.

One of the most promising appearing of such proposals was to react a gas mixture comprising ammonia and a gaseous or vaporized hydrocarbon with the requisite amount of oxygen or air to accomplish the desired oxidation. The mixture, at or below atmospheric pressure, was subjected to combustion in the presence of a suitable catalyst, preferably a metallic platinum-iridium alloy, although other noble metals and alloys were suggested. The hydrocyanic acid content of the combustion products was separated therefrom.

Theoretically, the operation of such a process appears to offer many commercial advantages. It employs readily-available starting materials and appears to be a relatively straight-forward reaction, capable of being conducted readily in simple apparatus. In attempted practice, however, appearances proved deceptive and unexpected difficulties have been found. One of the most serious of these has been found to be the consistent physical failure of the catalyst after but a very short active life. The resultant difficulties, including the necessity for frequent shutdowns to replace the catalyst and excessive catalyst replacement costs, have resulted in the process being considered generally as impractical for industrial use.

Nevertheless, the process, if it could be successfully carried out, does offer such desirable features that it is the principal object of the present invention to develop a physical catalyst structure, for use in the reaction chamber, which is less subject to those service failures encountered by and in prior practice.

In accordance with the present invention this result has been accomplished by using as the catalyst structure a combination of metallic gauze formed into a multi-layered conical shape of certain proportions, the cone being unitarily attached to a suitable supporting annulus of sheet material. Not only does this novel structure accomplish the desired object surprisingly well but additional advantages are found in its simplicity of fabrication, mechanical strength and ease of mounting and replacement.

A particularly effective chamber for use in carrying out the process of the present invention has also been developed, forming the subject matter of my copending application, Serial No. 743,595, filed of even date. The present catalyst structure will therefore be considered in relation thereto.

The invention will be more fully discussed in conjunction with the accompanying drawings which illustrate the essential features of the present invention and in which:

Figure 1 is an isometric projection, partly in section representing a portion of a gas delivery tube having one type of conical gauze of the present invention mounted thereon;

Figures 2 and 3 are cross-sections, showing methods of holding the gauze in conical shape;

Figure 4 is also an isometric projection, showing a different type of conical gauze for a different type mounting;

Figures 5, 6 and 7 are representations, in section, of possible gauze configurations; and Figures 8, 9, 10 and 11 are developments, showing the progression of forming steps whereby the gauze is fabricated into the preferred structure of the present invention.

In early attempts to carry out the reaction between ammonia, a hydrocarbon, and oxygen to obtain hydrocyanic acid, the catalyst was used in the form of particulate material or as metallic depositions on inert carrier materials. These attempts were largely abandoned in favor of using the metal, as in other successful ammonia combination reactions, in the form of a gauze or net. In such cases, a flat piece of gauze, of suitable area, is mounted either within or on the end of a suitable conduit, usually of ceramic material, capable of resisting the high operating temperatures and through which gas is delivered to the combustion chamber. Substantially all reaction takes place in passing through or immediately after passing through the gauze. In the present process, however, operation under these conditions proved wholly impractical because of the extremely short life of the catalyst.

Usually failure of the gauze occurred in the area in contact with or adjacent to the gas delivery tube. This was thought due, at least in part, to non-uniform gas throughput over the area of the gauze and to the cooling effect of the relatively greater mass of supporting material, the cooler portions of the gauze apparently being the first attacked. The problem was sufficiently serious so that one proposed modification even went so far as to provide special external means for supplying extra heat to those areas of the gauze in which incipient failure was first observed.

Other difficulties with using the flat gauze of the prior art are manifold. A flat gauze must be stronger because the stress on any one wire is greater. In $NH_3 \rightarrow HNO_3$ oxidation plants, for example, this may be overcome by a supporting grid. No material has been found suitable for a supporting grid in the present operation. Also, a flat grid of necessity requires a large diameter reactor vessel for a given gas velocity at the gauze. Not only does this demand unnecessarily large apparatus but because there is a danger of backfiring when starting operation, the risk is increased, due to the relatively low velocity ahead of the gauze.

Changing to a cylindrical type of gauze is not particularly helpful. In the first place, gas distribution through such a gauze structure is very poor, resulting in uneven heating. In addition, the cylindrical shape aggravates the gauze deterioration problem by introducing two deteriorating edges, at the bottom as well as at the top.

In accordance with the present invention these difficulties are overcome by a structure which embodies a combination of several features. The catalyst structure of this invention may be considered as made up of two elements; (a) a pyramidal or conical gauze section having (b) a sheet metal annulus unitarily attached to the cone at its base.

The general catalyst structure of the present invention is well shown, for example, in Figure 1 in which the reaction mixture is shown as brought to the widest diameter of the catalyst cone through a ceramic delivery tube 1. The cone 2 is mounted on the end of tube 1 by means of a sleeve 3 of relatively thin metal to which the conical section is unitarily attached as by welding 4. In this modification the gauze portion will be seen to comprise a conical section 2 made up of the three layers 5, 6 and 7.

The multi-layered conical structure may be retained by any desired means. For example, the seams of the cone are advantageously sealed by welding. This, however, requires care not to prevent or restrict the passage of gas through the area of the weld. To avoid this another means is shown in Figure 2 which is an enlarged cross-section of the gauze through line 2—2 in Figure 1. As shown in Figure 2, the edges 8 and 9 are made to overlap slightly and are held in position by stitching, using a wire 10, usually of the same metal or alloy as the catalyst gauze or a wire of compatible, corrosion-resistant nature.

Such a structure works well in practice, despite the fact that for a narrow strip there is an extra thickness of gauze. If desired, this feature can be eliminated by bringing edges 8 and 9 into substantial alignment as shown in Figure 3 and fastening the gauze by two rows of stitching 11 and 12. Since the overlapping in any case is usually small, it may, however, be largely a matter of choice whether a fastening such as that of Figure 2 or Figure 3 or even a welded seam, is eventually chosen.

Thus, as shown in Figure 1 that portion of the catalyst structure which is adjacent to or in contact with the ceramic material comprises thin sheet metal of relatively heavy density as compared with the apparent density of the gauze comprising the major portion of the conical shape. This sheet metal collar or annulus serves several purposes in addition to forming a convenient mounting means. It provides extra strength at the point of attachment. If corrosion occurs, the solid sheet can tolerate it longer than the open gauze structure without mechanical failure. Its principal advantage, however, lies in the fact that it serves to position the gauze section more advantageously. As shown in Figure 5, if a gauze conical structure 13 is slipped over a tube 14, there is a stagnant zone 15 below the end of the delivery tube. Little or no gas flows through the gauze in this area, which is therefore cooler than the remainder and markedly susceptible to the incipient failure in cool areas noted above in considering flat gauze structure.

Theoretically, these difficulties could be overcome as shown for example in Figure 6, by forming the outer wall of tube 14 near its end to provide an edge as at 16 and having a gauze which in profile section exactly coincided with the flow distribution curve of the gas coming through the delivery tube. Such a gauze, however, is obviously impractical, both because of the difficulty in determining the necessary exact profile and because such a profile would not be correct for any except one definite set of flow conditions in the tube. The latter obviously cannot be maintained absolutely constant in any practical operation.

Surprisingly, it has been found in accordance with the present invention that, as shown in Figure 7, if a gauze 18 is formed in a conical shape of suitable general proportions, held out of the stagnant area 15 by a suitable thin metal sleeve or annulus 19, an excellent approximation of the desired curved profile is obtained. A sufficiently uniform gas flow through the gauze as so positioned is obtained to prevent excessive temperature differentials over the catalyst area. Susceptibility to failure at or near the supporting material is largely eliminated.

Using sheet metal in this way, however, is not solely responsible for the success of the present catalyst structure. The latter is largely due to the fact that the gauze portion of the catalyst is fabricated into the multi-layered conical shape. This is indicated by the fact that merely adding mass, either as a flat surface or as an upstanding collar, around a flat gauze only slightly increases the useful life of the latter.

In some cases it may be undesirable to use a supporting sleeve of the type shown at 3 in Figure 1. In such cases, the conical gauze structure may be attached to a sheet metal annular ring of the catalyst metal or alloy. This is shown for example, in Figure 4 in which conical gauze 20 is attached to an annular ring 21. Such a ring also permits ready mounting, being easily supported against the end of delivery tube 1 by means of an annular supporting ring 22. Ring 22, in turn, may be supported in any desired manner, forming no part of this invention. Usually this will be done by using ring 22 as a part of the lining of the reaction chamber.

The relative sizes and proportions of the conical gauze have optimum relationships each with the other. As noted above, the supporting portion of the gauze, whether a sleeve 3 or a ring 21, or an equivalent structure should be a metal. It may be the same or a different metal or alloy than the metal comprising the wire of which the gauze itself is formed. If a different material, it must be incapable of inducing side reactions, and should, if possible, have a lower heat conductivity and be corrosion resistant at operating condtions. As to thickness, a good general practice is to have the sheet metal of the supporting section as thin as is consistent with the necessary strength in order to minimize heat transfer from the gauze.

The gauze itself is of relatively fine mesh which, however, may be varied within limits. For most purposes about 40-80 mesh, with a more narrow optimum of from about 50-60 mesh, is usually found to be highly suitable. Whereas netting both finer and coarser than these limits may be used if so desired, the mesh size chosen somewhat limits the size of the wire from which mesh is formed. In the preferred range noted, this will usually comprise wire of from about 0.003-0.006 inch in diameter.

While the finer the mesh size used the greater the exposed catalyst surface, a practical limitation is also imposed by the fact that a certain inherent physical strength of structure is essential. It is therefore found most practical to use a coarser mesh and heavier wire to obtain physical strength and to provide additional surface, if necessary, by the use of multiple layers. Any desired number of layers may be used. In accordance with the present invention, it has been found that using, for example, about a 50-60 mesh gauze made of 0.004-0.005 inch wire, three layers provide about the optimum mass of catalyst of the desired exposed area. This forms a structure of sufficient strength to be used over a wide range of burner sizes, provides the necessary surface and does not encroach appreciably on the zone of diminishing return.

It is important that the layers of mesh comprising the pyramidal structure be in intimate contact each with the other. This can be done by properly shaping the superposed layers. Where possible, however, it is preferred that in the shaping the layers be welded together. In so doing care must be taken to cause the minimum flattening of the wire of which the mesh is composed, especially precaution should be taken that flattening does not occur in one area more than in another. It is highly desirable that the structure of the cone shall not prevent uniform gas flow therethrough. For this reason it is also highly desirable that the openings be uniform and that the openings be uniformly spaced.

Since it is possible to make a pyramidal shape gauze of almost any desirable cross-section, it is possible to fabricate a catalyst gauze of the type preferred in the present invention suitable for use with a gas delivery tube of almost any cross-section. However, it is probably most desirable to use a gas delivery conduit of circular cross-section. This simplifies both fabrication of the gauze and the problem of approximating a uniform gas distribution of and through it. In the case of a conical gauze of circular cross-section, the greatest horizontal diameter must obviously coincide approximately with the outer diameter of the gas conduit, as shown for example in Figures 1 and 4. The proportions of the conical section, however, may be varied considerably by changing the heighth of the cone itself.

While not the only method of fabricating the conical section, a simple, preferable method of so doing is illustrated in Figures 8, 9, 10 and 11. The catalyst metal gauze is formed into a circle of a suitable diameter "D," as shown in Figure 5. This circle is then cut along one radius forming free edges 23 and 24. The free edges are then overlapped and the sheet progressively rolled up about one, for example, 23, as shown in Figures 9 and 10. Rolling is continued until the requisite number of overlapping layers is obtained. For example, in Figure 11 this is shown to be three layers with a slight overlap corresponding to the structure of Figures 1, 2 and 4, thereby producing a cone of largest cross-section "O. D.."

Obviously the largest diameter "O. D." will be a linear function of the diameter "D" of the original circle and of the number of overlapping turns. The heighth H of the cone will also be a function thereof. In preparing a triple layer cone in accordance with the preferred modification of the present invention, a good practice is to choose a circle having a diameter "D" equivalent to about 2.75 to about 3.25 times the diameter "O. D." A diameter "D" equivalent to about 3 O. D. is a good general practice.

Certain strain in the wire composing the mesh is inevitably caused during fabrication. This is especially true in those cases where the layers comprising the multiple section are welded together. Such a situation tends to shorten the life of the catalyst. Accordingly, the catalyst structure should be annealed immediately after manufacture or it should be heated in the apparatus at relatively low temperature for sufficient time to relieve the strain before the gas mixture to be reacted is fed thereto.

I claim:

1. A fabricated catalyst structure comprising a conically-shaped, multi-layered wire gauze, the circular edge at its basal circumference being integrally attached to the edge of a single-layered, sheet-metal mounting section, the gauze comprising the multi-layered section being a circular single sheet having 40-80 openings per linear foot and having two free radial edges only, one such edge lying along the inner surface of the cone and extending from the base to the point, the other being substantially aligned therewith but lying along the outer surface of the cone, the layers in the conical section being in uniform direct contact, the wires comprising the gauze in any one layer being integrally united to the wires in any adjacent layer in contact therewith and the openings in any one layer being uniformly positioned with regard to the openings in all layers in contact therewith.

2. A catalyst gauze structure according to claim 1 in which said mounting section comprises a circular metal sleeve of diameter approximately that of the greatest horizontal cross-section of the cone, said conical section being welded to one end of said sleeve.

3. A catalyst gauze structure according to claim 1 in which said mounting section comprises an annular ring having an inner diameter approximating the diameter of the base of the conical section, said conical section being unitarily attached to said annular ring at the inner circumference thereof.

4. A catalyst gauze structure according to claim 1 in which said mounting section comprises an annular ring the inner circumference of which has been upset to place the inner edge outside the plane of the main body of the ring, said upset edge being attached to the base of the multi-layered conical section.

ALFRED G. HOUPT.

REFERENCES CITED

The following references are of record in the file of this patent:

UNITED STATES PATENTS

| Number | Name | Date |
|---|---|---|
| 989,620 | Lowery | Apr. 18, 1911 |
| 1,043,580 | Eldred | Nov. 5, 1912 |
| 1,222,608 | Dewar et al. | Apr. 17, 1917 |
| 1,253,927 | Bradshaw | Jan. 15, 1918 |
| 1,400,204 | Backhaus | Dec. 13, 1921 |
| 1,516,187 | Hanson | Nov. 18, 1924 |
| 1,887,052 | Wendeln | Nov. 8, 1932 |
| 1,927,508 | Titlestad et al. | Sept. 19, 1933 |
| 2,045,632 | Colby | June 30, 1936 |
| 2,190,683 | Schaaf et al. | Feb. 20, 1940 |
| 2,276,229 | Dixon | Mar. 10, 1942 |